July 15, 1947. C. R. JENKINS 2,424,037
PRESSURE APPLYING DEVICE FOR CLAMPS AND THE LIKE
Filed April 9, 1945
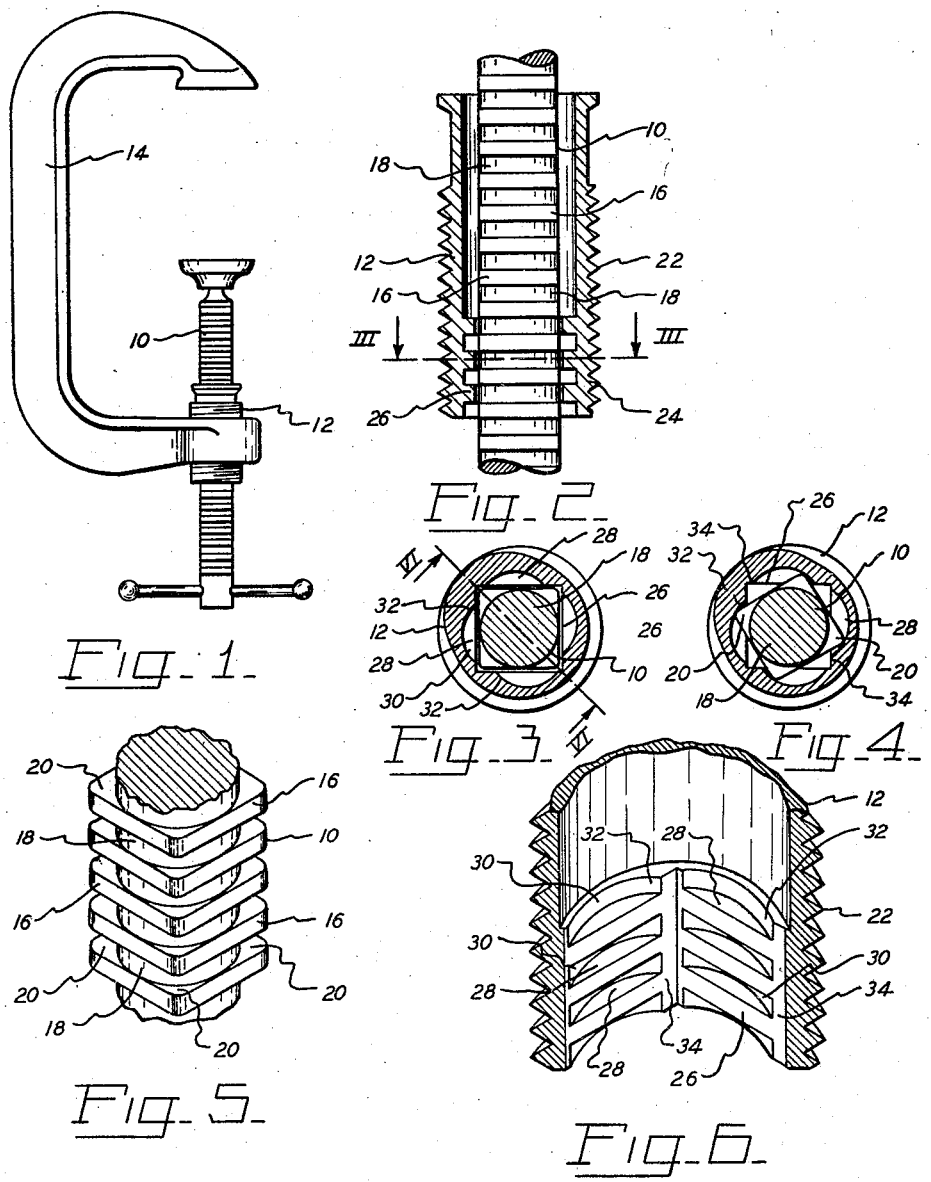
Inventor
CHARLES RAY JENKINS
By Beaman & Langford
Attorneys Patented July 15, 1947

2,424,037

UNITED STATES PATENT OFFICE 2,424,037

PRESSURE APPLYING DEVICE FOR CLAMPS AND THE LIKE

Charles Ray Jenkins, Parma, Mich., assignor to Harry D. Boardman, Jackson, Mich., as trustee Application April 9, 1945, Serial No. 587,362

1 Claim. (Cl. 74—424.8)

The invention relates to improvements in quick acting pressure applying devices.

An object of the invention is to provide an improved rapid traverse pressure applying device having a bushing through which a shaft is smoothly guided in one position and in another position clutched to the bushing and advanced with mechanical advantage.

Another object resides in providing a pressure bar and bushing of the type described in which the bushing is so designed as to form a smooth guide for the bar as well as an improved driver.

These and other objects and advantages residing in the specific details of construction of the bushing and associated pressure bar will appear from a consideration of the following description and claim.

Fig. 1 is a side elevational view of a C-clamp frame embodying the present invention, Fig. 2 is an enlarged view of the bar and bushing assembly, with the bushing shown in longitudinal cross section, Fig. 3 is a cross-sectional view on line III—III of Fig. 2, Fig. 4 is a view similar to Fig. 3 with the bar rotated into interlocking position, Fig. 5 is a fragmentary perspective view of the bar construction, and Fig. 6 is a cross-sectional perspective view with the section taken on line VI—VI of Fig. 3.

The bar 10 and bushing 12 are illustrated in Fig. 1 as adapted to a C-clamp frame 14. It will be appreciated that the rapid traverse pressure unit may be adapted to many forms of pressure applying devices, clamps, vises, jigs, fixtures and the like.

As more clearly shown in Fig. 5, the bar 10 comprises a plurality of similar equally spaced flanges 16 spaced by reduced portions 18. When using square stock and with the portion 18 cylindrical, four thrust lugs 20 are provided, one at each corner.

The bushing 12 is shown threaded at 22 so as to advance the bar 10 with mechanical advantage when interlocked and rotated. In the illustrated form, the lower end 24 of the bushing 12 has an opening 26 which is of the same shape as the cross section of the flange 16 and only slightly larger to permit the bar 10 to be freely advanced with rapid traverse through the bushing 12.

As more clearly shown in Fig. 6, the side walls of the opening 26 are formed with thrust ledges 28, preferably corresponding in number to the thrust lug 20 on each flange 16. The ledges 28 are spaced and dimensioned to permit the bar 10 to be partially rotated in the bushing 12 to bring the thrust lug 20 into overlapping arrangement with the thrust ledges 28, as shown in Fig. 4.

In order to limit the relative rotation of the bar 10 in the bushing 12 to locate the lugs 20 upon the ledges 28, the ledges 28 are slightly offset along the sides of the opening 26 to dispose the axially extending sides 30 at varying distances from the longitudinal axis of the bushing 12. This distance becomes less than one-half the distance across the corners of the flanges 16 at the points 32 which function as stops limiting relative rotation in one direction.

To assure smooth rapid traverse of the bar 10 in the opening 26, axially extending uninterrupted portions 34 of the opening 26 are provided by the offset arrangement of the ledges 28. With the bar 10 in the position shown in Fig. 3, by applying slight twisting pressure on the bar 10, the lugs 20 will engage the portions 34 to axially align the flanges 16 with the opening 26 to permit smooth, rapid traverse movement of the bar 10 relative to the bushing 12. Thereafter, rotation of the bar 10 to bring the parts into the position of Fig. 4 interlock the lugs 20 and ledges 28, and further rotation of the bar 10 will result in the bushing 12 being rotated with the bar 10 as a unit.

Having thus described my invention, what I desire to cover by Letters Patent and claim is:

A rapid traverse force applying unit comprising a bar having a radial projection thereon, a bushing having an opening to receive said bar and shaped to pass said bar and projection with relative axial movement in one position of axial alignment, a thrust ledge located in said bushing to one side of said opening upon which said projection is adapted to be moved upon partial relative rotation between said bar and bushing, a wall spaced at varying distances from the axis of said bar along said ledge to provide a stop for said projection when rotated in one direction, and an uninterrupted axially extending wall defining a portion of said opening and constituting a stop limiting rotation in the other direction for aligning said bar with said opening for smooth rapid traverse in said bushing, said walls and ledge being integral.

CHARLES RAY JENKINS.

REFERENCES CITED

The following references are of record in the file of this patent:

UNITED STATES PATENTS

| Number | Name | Date |
| --- | --- | --- |
| 898,604 | Rivers | Sept. 15, 1908 |
| 2,372,727 | Manning | Apr. 3, 1945 |